United States Patent [19]

Ford

[11] 4,026,785
[45] May 31, 1977

[54] ADJUSTABLE ELECTRODE

[75] Inventor: James M. Ford, Cleveland, Tenn.

[73] Assignee: Olin Corporation, New Haven, Conn.

[22] Filed: Dec. 22, 1975

[21] Appl. No.: 643,265

[52] U.S. Cl. .................... 204/286; 204/258; 204/266; 204/288; 204/297 R

[51] Int. Cl.² .................................. C25B 11/00

[58] Field of Search ............... 204/286, 288, 297 R

[56] References Cited

UNITED STATES PATENTS

| 3,674,676 | 7/1972 | Fogelman | 204/286 |
| 3,803,016 | 4/1974 | Conner | 204/286 |
| 3,873,437 | 3/1975 | Pulver | 204/286 |
| 3,941,676 | 3/1976 | Macken | 204/286 |

*Primary Examiner*—T. Tung

*Attorney, Agent, or Firm*—James B. Haglind; Donald F. Clements; Thomas P. O'Day

[57] ABSTRACT

An adjustable electrode for use in electrolytic cells is provided. The electrode comprises two electrode surfaces positioned in parallel and having a space between them. Two electrode posts are located in this space, one electrode post being rigidly attached to one electrode surface. Removable clamping means are attached to the upper portion of the electrode surfaces. The clamping means are positioned outside of the space between the electrode surfaces.

The adjustable electrode, employed for example in the electrolysis of alkali metal chlorides, has adjusting means which are readily accessible and where the inter-electrode spacing of the upper portion of the electrode surfaces can be conveniently changed.

14 Claims, 6 Drawing Figures

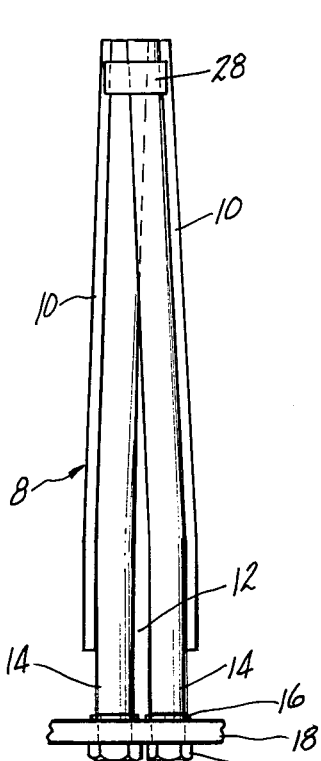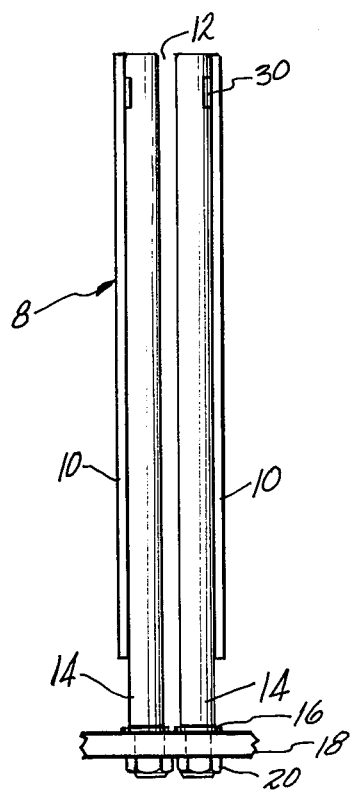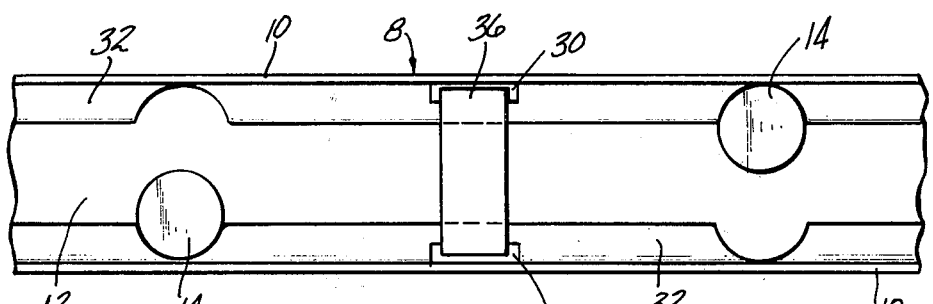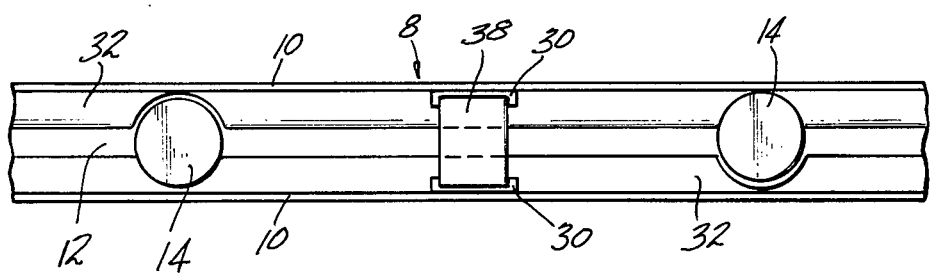

ADJUSTABLE ELECTRODE

The invention relates to electrolytic cells for the electrolysis of aqueous salt solutions. More particularly, this invention relates to adjustable electrodes employed in electrolytic cells for the electrlolysis of aqueous alkali metal chloride solution.

It is known to employ adjustable electrodes in, for example, diaphragm-type electrolytic cells, as illustrated by U.S. Pat. 3,674,676, issued July 4, 1972, to E. I. Fogelman. In this patent, expandable electrodes are employed in a cell having a riser attached to the bottom or base of the cell and extending upwards. Current is supplied to the electrodes through the riser by attaching two movable electrically conducting members to opposite sides of the riser and to the electrode surfaces. The movable members are positioned in the space between the electrode surface. To change the electrode space, each of the members must be adjusted separately by manually carrying out the required manipulations within the space between the electrode surfaces. The means of adjustment are therefore not readily accessible. In addition, the placement of the adjustable means within the space between the electrode surfaces makes assembly and disassembly of the electrodes more difficult. Further, the use of flexible electrically conducting members results in an increase in voltage across the flexible member.

It is further known, as described in U.S. Pat No. 3,941,676, issued Mar 2, 1976, to E. N. Macken to employ a rotary shaft having means of attachement to each of two electrode surfaces. Positioned in parallel, the electrode surfaces have a space between them. The rotary shaft may be positioned either in this space or outside of it. Rotation of the shaft varies the spacing between electrode surfaces. Considerable expense is required, however, in fabricating and attaching the apparatus to the electrode surfaces.

An improved adjustable electrode is therefore required where the inter-electrode spacing can be readily and conveniently changed.

It is an object of the present invention to provide a novel adjustable electrode useful in electrolytic cells for the production of chlorine and oxychlorine compounds.

An additional object of this invention is to provide a novel adjustable electrode useful in electrolytic cells employing metal electrodes.

Another object of the present invention is to provide a novel adjustable electrode where the adjustable elements are independent of those elements supplying current to the electrodes.

These and other objects of the present invention are accomplished in an adjustable electrode suitable for use in a cell for the electrolysis of alkali metal chlorides which comprises:
 a. two electrode surfaces positioned vertically in parallel and having a space between the electrode surfaces, the electrode surfaces having an upper portion and a lower portion,
 b. at least two electrode posts positioned in the space between the electrode surfaces, each electrode post rigidly attached to one electrode surface, and
 c. removable clamping means adapted to contact the upper portion of the electrode surfaces, the removable clamping means being positioned outside of the space between the electrode surfaces.

Accompanying FIGS. 1–6 illustrate the novel adjustable electrodes of the present invention. Corresponding parts have the same numbers in all Figures.

FIG. 1 represents a side elevation of an adjustable electrode of the present invention in expanded form.

FIG. 2 illustrates a side elevation of the adjustable electrode of FIG. 1 in contracted form.

FIG. 3 depicts a top view of an adjustable electrode of the present invention in expanded form.

FIG. 4 shows the adjustable electrode of FIG. 3 in contracted form.

Figure 5:
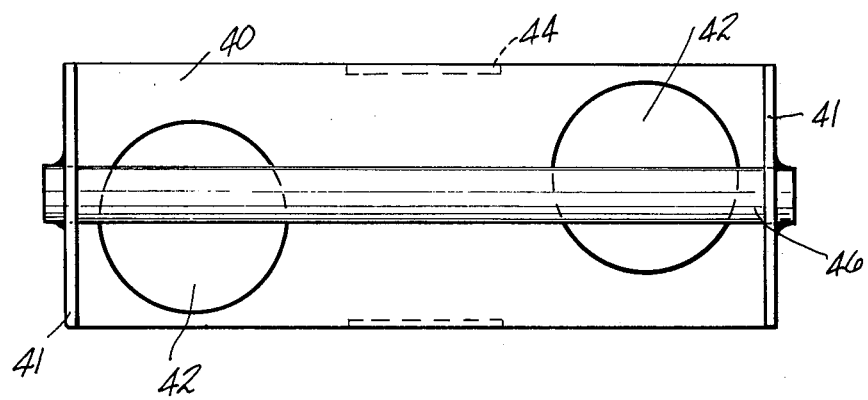

FIG. 5 portrays an additional embodiment of the clamping means for the adjustable electrode of the present invention.

Figure 6:
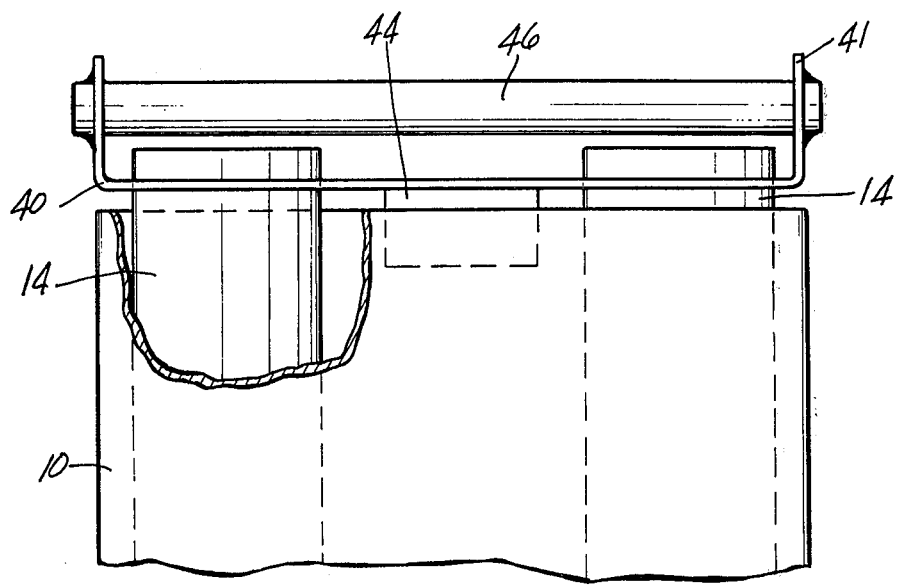

FIG. 6 illustrates the clamping means of FIG. 5 attached to an adjustable electrode.

Electrode 8 in FIG. 1 is comprised of electrode posts 14 having electrode surfaces 10 directly attached. Electrode posts 14 have space 12 between them. Electrode posts 14, having washers 16 atached to the lower end are secured to electrode plate 18 by nuts 20. Slots 30 are located along the outer edge of the upper portion of electrode surfaces 10. By inserting clip 28 into slots 30, the electrode posts 14 are drawn together in the upper portion of electrode 8, as illustrated in FIG. 2. Space 12 is reduced in the upper portion while remaining the same as that in the expanded form in the lower portion.

Another embodiment is shown in FIG. 3 which is a top view of electrode 8 having electrode surfaces 10 attached to electrode posts 14.

Flanges 32, on the upper edges of electrode surfaces 10, have portions cut away for electrode posts 14. Space 12 between flanges 32 is maintained in expanded form by inserting clip 36 into slots 30 along the inside upper edge of electrode surfaces 10. Clip 36 is positioned above flanges 32.

To contract the upper portion of electrode 8, as depicted in FIG. 4, clip 36 is replaced by clip 38 and flanges 32 are drawn together, reducing intra-electrode space 12.

An additional embodiment of the clamping means is shown in FIG. 5. Plate 40 having vertical ends 41 has openings 42 for electrode posts 14. Tabs 44 are attached along the edges of plate 40. Handle 46 spans plate 40 and is attached to vertical ends 41.

When plate 40 is employed to contract an adjustable electrode, openings 42 are placed over electrode posts 14 and tabs 44 on plate 40 are inserted in slots 30.

The adjustable electrode of the present invention is secured to a cell base or side wall having means of supplying electric current to the electrode where the electrode serves as an anode, or having means of removing current from the electrode where it serves as a cathode. Preferably the electrode is used as an anode in a cell for the electrolysis of alkali metal chloride to produce chlorine and an alkali metal hydroxide or an alkali metal chlorate, however, other uses of the electrode of the present invention will be discerned by those skilled in the art.

Two electrode surfaces are positioned in parallel and have a space between them. Normally, the electrode surfaces are rectangular and may be positioned vertically. The space can be any suitable distance, for example, from about 15 to about 50 millimeters. Positioned in this space are two or more electrode posts. The electrode posts are rigidly attached to the electrode surfaces to provide electrical contact between the electrode posts and the electrode surfaces. One of the electrode posts is attached to only one of the electrode surfaces. The electrode post may be directly attached to the electrode surface, for example, by welding. In addition, the electrode posts may be attached to a rigid conductive member such as a bar or rod which is also attached directly to the electrode surface.

The electrode posts may be attached to their respective electrode surfaces within the intra-electrode space so that they are directly opposite each other, are evenly alternated or unevenly alternated. Where alternated, the spacing between conductive supports on the same electrode surface is selected to provide optimum current distribution and mechanical support. In a preferred embodiment, the conductive supports are unevenly alternated.

Alternate embodiments may employ tapered electrode posts, with the tapered end being attached to the upper portion of the electrode surfaces; or electrode posts comprised of sections having varying diameters and joined together, for example, by welding.

If desired, as shown in FIG. 6, the electrode post may extend beyond the upper edge of the electrode surfaces.

To provide the means of adjustment for the electrode of the present invention, a clamping means is attached to the contacting portion of each electrode surface. The contacting portion may be any suitable portion of the electrode surfaces. For example, where the electrode posts are positioned vertically, the clamping means are attached to the upper portion of the electrode surfaces and the contacting portion is from about 50 to about 90 percent of the height of the electrode surfaces, and preferably from about 60 to about 80 percent of the height of the electrode surfaces. Attachment means for the clamping means include, for example, providing a groove or slot along the edge of the electrode surface in which an edge of the clamping means may be inserted.

Any suitable clamps or clips may be used as long as the clamping means will provide the force necessary to contract the upper portion of the electrode surfaces, and reduce the intra-electrode space in the contracting portion the desired distance. During contraction the non-contracting portion of the electrode surfaces remain substantially parallel to each other.

In one embodiment, as illustrated in FIG. 5, the clamping means is a band or strip having tabs along the outer edges. The tabs fit into slots or grooves attached to the inner side of the upper edge of the electrode surfaces. Holes are cut in the band to position the electrode posts in the desired position upon contraction or expansion. The band is placed along the upper edge of the electrode surfaces as shown in FIG. 6. The band may have a flange at each end with a handle attached to the flange to aid in positioning the band.

Any suitable materials of construction may be used for the clamping means which are resistant to the gases and liquids found in the electrolytic cell. Where the cell is used for the electrolysis of sodium chloride, the clamping means may be composed of electrically conducting metals such as titanium or tantalum where the electrode serves as an anode; steel, nickel, copper, or copper alloys where the electrode serves as a cathode. It may be economically advantageous to use non-conducting materials such as hard rubber and plastic materials such as polytetrafluorethylene, polyvinylidene chloride, polyester resins, polyvinyl chloride, and postchlorinated polyvinyl chloride. Preferred non-conducting materials of construction for the clamping means include hard rubber and polytetrafluoroethylene.

The adjustable electrode of the present invention is suitable for use in an electode assembly for diaphragm-type electrolytic cells for the electrolysis of alkali metal chloride solutions such as sodium chloride. An electrode assembly comprises the electrode and electrode plate. The electrode posts are attached to the electrode plate which may be the cell base or bottom, a side wall or the top or cover of the cell. Any suitable known means of attachment such as bolting or the like may be used to attach the electrode posts substantially perpendicular to the electrode plate. As illustrated in FIG. 2, the electrode has a contracting portion and a non-contracting portion. That portion of the electrode which is adjacent to the electrode plate is the non-contracting portion of the electrode and may be from about 10 to about 50 percent, and preferably from about 20 to about 40 percent of the length of the electrode. The contracting portion of the electrode is therefore from about 90 to about 50 percent and preferably from about 80 to about 60 percent of the length of the electrode. Removable clamping means are attached to the contracting portion of the electrode, preferably along the edge of the electrode surfaces furthest from the electrode plate, to reduce the space between the electrode surfaces.

Where the electrode surface serves as the anode, a foraminous metal which is a good electrical conductor may be used. It is preferred to employ a valve metal, such as titanium or tantalum or a metal, for example, steel, copper, or aluminum clad with a valve metal such as tantalum or titanium. The valve metal has a thin coating over at least part of its surface of a platinum group metal, platinum group metal oxide, an alloy of a platinum group metal or a mixture therof. The term "platinum group metal" as used in the specification, means an element of the group consisting of ruthenium, rhodium, palladium, osmium, iridium, and platinum.

The anode surfaces may be in various forms, such as solid sheets, perforated plates or an expanded mesh which is flattened or unflattened, and having slits horizontally, vertically, or angularly. Other suitable forms include woven wire cloth, which is flattened or unflattened, bars, wires, or strips arranged, for example, vertically, and sheets or plates having perforations slits or louvered openings.

A preffered anode surface is a foraminous metal mesh having good electrical conductivity in the vertical direction.

As the cathode, the electrode surface is suitably a metal screen or mesh where the metal is, for example, iron, steel, nickel, or titanium. If desired, at least a portion of the cathode surface may be coated with a platinum group metal, oxide or alloy, as defined above.

The adjustable electrode of the present invention is readily installed amd disassembled. Where the electrode surface needs to be removed, for example, for recoating of the electrochemically active area, the posts are accessible for disconnection. Adjustment of the inter-electrode space for the upper portion of the electrode can be done from outside the electrode surfaces without having to gain access to the space between the electrode surfaces. The clamping means may be fabricated from inexpensive materials of construction.

In particular, the adjustable electrode of the present invention is suitable for use during assembly or disassembly of the electrolytic cell. The clamping means are attached to the top edge or the side edges in the upper portion of the electrode surfaces of the electrodes contracted. The width of the clamping means determines the amount of contraction. Prior to operating the electrolytic cell, the clamping means are removed and the upper portion is expanded so that the two electrode surfaces are positioned in parallel.

What is claimed is:

1. An electrode suitable for use in a cell for the electrolysis of alkali metal chloride solutions which comprises:
   a. two electrode surfaces positioned vertically in parallel and having a space between said electrode surfaces, said electrode surfaces having an upper portion and a lower portion,
   b. at least two electrode posts positioned in said space between said electrode surfaces, each of said electrode posts being rigidly attached to one of said electrode surfaces, and
   c. removable clamping means contacting said upper portion of said electrode surfaces to contract said space between said upper portion of said electrode surfaces, said removable clamping means being positioned outside of said spacers between said electrode surfaces.

2. The electrode of claim 1 in which said upper portion of said electrode surface is from about 50 to about 90 percent of the height of said electrode surface.

3. The electrode of claim 2 in which said clamping means is a clip and said electrode surfaces have attachment means for said clip.

4. The electrode of claim 3 in which said clip is attached to the top edge of said electrode surfaces.

5. The electrode of claim 4 in which electrode posts are alternately positioned with respect to each other.

6. The electrode of claim 4 in which said electrode posts are positioned opposite each other.

7. The electrode of claim 2 in which said electrode posts extend above said electrode surfaces and said clamping means is a plate having openings for positioning said electrode posts and means for attaching said plate to the top edge of said electrode surfaces.

8. An electrode assembly suitable for use in a cell for the electrolysis of alkali metal chloride solutions which comprises:
   a. two electrode surfaces positioned in parallel and having a space between said electrode surfaces,
   b. at least two electrode posts positioned in said space between said electrode surfaces, each of said electrode posts being rigidly attached to one of said electrode surfaces,
   c. an electrode plate,
   d. one end of each of said electrode posts being attached substantially perpendicularly to said electrode plate; said electrode surfaces and said electrode posts comprising an electode, said electrode having a contracting and a non-contracting portion, said non-contracting portion being adjacent to said electrode plate, and
   e. removable clamping means contacting said contracting portion of said electrode surfaces to contract said space between said electrode surfaces, said removable clamping means being positioned outside of said space between said electrode surfaces.

9. The electrode assembly of claim 8 in which said contracting portion of said electrode is from about 50 to about 90 percent of the length of said electrodes.

10. The electrode assembly of claim 9 in which said clamping means is a clip and said electrode surfaces have attachment means for said clip.

11. The electrode assembly of claim 10 in which said clip is attached to the edge of said electrode surfaces positioned furthest away from said electrode plate.

12. The electrode assembly of claim 9 in which said electrode plate is positioned horizontally.

13. The electrode assembly of claim 9 in which said electrode plate is positioned vertically.

14. The electrode of claim 9 in which said electrode posts extend above said electrode surfaces and said clamping means is a plate having openings for positioning said electrode posts.

* * * * *

UNITED STATES PATENT OFFICE
CERTIFICATE OF CORRECTION

Patent No. 4,026,785   Dated May 31, 1977

Inventor(s) James M. Ford

It is certified that error appears in the above-identified patent and that said Letters Patent are hereby corrected as shown below:

Column 1, line 8, delete "solution" and insert --solutions--.

Column 1, line 19, delete "surface" and insert --surfaces--.

Column 2, line 20, delete "atached" and insert --attached--.

Column 4, line 48, delete "preffered" and insert --preferred--.

Column 4, line 53, delete "titanium" and insert --tantalum--.

Claim 4, column 5, line 35, after "edge" insert --of each--.

Claim 11, column 6, line 33, after "edge" insert --of each--.

Signed and Sealed this

Fifteenth Day of November 1977

[SEAL]

Attest:

RUTH C. MASON
Attesting Officer

LUTRELLE F. PARKER
Acting Commissioner of Patents and Trademarks